(12) United States Patent
Ludois

(10) Patent No.: US 9,571,010 B2
(45) Date of Patent: Feb. 14, 2017

(54) VARYING CAPACITANCE ROTATING ELECTRICAL MACHINE

(71) Applicant: Wisconsin Alumni Research Foundation, Madison, WI (US)

(72) Inventor: Daniel Colin Ludois, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 0 days.

(21) Appl. No.: 14/872,312

(22) Filed: Oct. 1, 2015

(65) Prior Publication Data

US 2016/0028328 A1 Jan. 28, 2016

Related U.S. Application Data

(63) Continuation of application No. 13/285,850, filed on Oct. 31, 2011, now Pat. No. 9,184,676.

(51) Int. Cl.
*H02N 1/00* (2006.01)
*H02N 1/08* (2006.01)

(52) U.S. Cl.
CPC .................. *H02N 1/08* (2013.01); *H02N 1/00* (2013.01); *H02N 1/002* (2013.01); *H02N 1/006* (2013.01)

(58) Field of Classification Search
CPC ............. H02N 1/00; H02N 1/08; H02N 1/002
USPC ......................... 310/300, 308–309; 318/116
See application file for complete search history.

(56) References Cited

U.S. PATENT DOCUMENTS 3,629,624 A * 12/1971 Staudte .................. H02N 1/004
310/309
4,642,504 A * 2/1987 Jacobsen ................ H02N 1/004
310/308
9,184,676 B2 * 11/2015 Ludois ..................... H02N 1/00

* cited by examiner

*Primary Examiner* — Burton Mullins
(74) *Attorney, Agent, or Firm* — Boyle Fredrickson, S.C.

(57) ABSTRACT

A varying capacitance rotating electrical machine provides capacitor elements, such as capacitor plates, that move with respect to each other as separated by a thin film of fluid, for example, air, on which one capacitor element floats. In one embodiment, multiple plates provide for three-phase operation. Narrow gaps provided by the floating capacitor elements increase the power density of the rotating electrical machine.

15 Claims, 9 Drawing Sheets

VARYING CAPACITANCE ROTATING ELECTRICAL MACHINE

CROSS-REFERENCE TO RELATED APPLICATIONS

This application is a continuation of U.S. application Ser. No. 13/285,850 filed Oct. 31, 2011 now U.S. Pat. No. 9,184,676 and hereby incorporated by reference.

BACKGROUND OF THE INVENTION

The present invention relates to rotating electrical machines (e.g. electrical motors and generators) and in particular to a rotating electrical machine employing variable capacitance with a capacitor plate supported on fluid bearings.

Electrical motors and generators share similar structures of an electrically interacting stator and rotor and may be collectively termed "rotating electrical machines." Conventional rotating electrical machines may be roughly characterized as exploiting magnetic fields and/or change in inductance (reluctance) between moving parts. It is also possible to construct rotating electrical machines that exploit electric fields and/or change in capacitance between the moving parts. Such varying capacitance rotating electrical machines have a number of advantages over conventional varying inductance motors including the elimination of magnets, ferrous materials, and high current copper windings. As a result, such varying capacitance rotating electrical machines allow potentially higher-speed operation (by eliminating the mass of ferrous materials and magnets and the complex structure of windings) and higher temperature operation (as limited by magnetic materials and winding insulation), and higher efficiency by operating at high voltages with low resistive losses.

An obstacle to the development of varying capacitance rotating electrical machines is the relatively low capacitive coupling that can be obtained between the stator and rotor resulting in low power density (e.g. the need for physically large devices for a given power level).

SUMMARY OF THE INVENTION

The present invention provides a varying capacitance rotating electrical machine in which capacitive coupling is obtained between rotating and stationary capacitor plates by allowing one plate to float on a cushion of fluid, generated by the relative motion of the plates, in the manner of an air bearing. The small gaps between the plates, achievable with reasonable manufacturing tolerances, greatly increase the power density of the device.

Specifically, in one embodiment, the present invention provides a rotating electrical machine having a rotor mounted for rotation with respect to a frame about an axis and including at least one circumferentially displaced plate and non-plate region having different electrical properties. A stator fixed with respect to the frame provides at least one conductive plate aligned and unaligned with the plate region of the rotor during rotation of the rotor. At least one of the plate regions of the rotor and plate of the stator are axially movable to float in separation from the other of the plate regions of the rotor and stator on a fluid film.

It is thus a feature of at least one embodiment of the invention to provide high power densities for varying capacitance motors by allowing closer coupling of the capacitive plates. By floating the capacitive plates on a cushion of air, dimensional variations resulting from wear or manufacturing tolerances may be accommodated.

The fluid may be air.

It is thus a feature of at least one embodiment of the invention to provide a simple design borrowing from the principles of an air bearing.

Alternatively, the fluid may be a liquid.

It is thus a feature of at least one embodiment of the invention to provide a system using an incompressible material offering improved mechanical stability and/or higher separation forces.

The invention may provide a spring element biasing at least one of the plate regions axially toward the other of the plate regions.

It is thus a feature of at least one embodiment of the invention to promote extremely close proximity between components of the varying capacitors.

The plate region of the rotor may be a conductive plate.

It is thus a feature of at least one embodiment of the invention to provide a simple rotor mechanism employing conductive plates that move into alignment and out of alignment with changes in the capacitance.

The conductive plates of the stator and conductive plates of the rotor may each connect to stationary terminals on the frame for communication with external circuitry.

It is thus a feature of at least one embodiment of the invention to provide a simple configuration in which the varying capacitance is defined by one or more elements having only two components subject to relative displacement.

The stator or the rotor may include three electrically independent sets of plates distributed in equal angles about the axis, the plates of each set joined electrically, and the other of the stator and rotor includes different conductive plates providing for periodic varying capacitance between conductive plates of the electrically independent sets and at least one of the different conductive plates, the periodic varying capacitances each offset in phase from the others by an angular magnitude of 120°.

It is thus a feature of at least one embodiment of the invention to provide a three-phase rotating electrical machine (either a motor or generator) and the advantages attendant to such three-phase operation.

The rotating electrical machine may further including a second stator positioned on an opposite side of the rotor from the first stator, the second stator providing a conductive plate region aligned and unaligned with the plate region of the rotor during rotation of the rotor.

It is thus a feature of at least one embodiment of the invention to provide a system that does not require slip rings to communicate electrical signals to or from the rotor. By flanking the rotor with opposed stator plates, electrical terminations can be confined to the fixed stator plate elements.

In one embodiment the plate region may include a material of higher dielectric than the non-plate region.

It is thus a feature of at least one embodiment of the invention to provide a material increasing the capacitance when the plate region of the rotor is aligned with the plate of the stator.

The rotor may include an electret material.

It is thus a feature of at least one embodiment of the invention to provide electrostatic augmentation of the operation of the device.

These particular features and advantages may apply to only some embodiments falling within the claims and thus do not define the scope of the invention.

DETAILED DESCRIPTION OF THE PREFERRED EMBODIMENT

Figure 1:
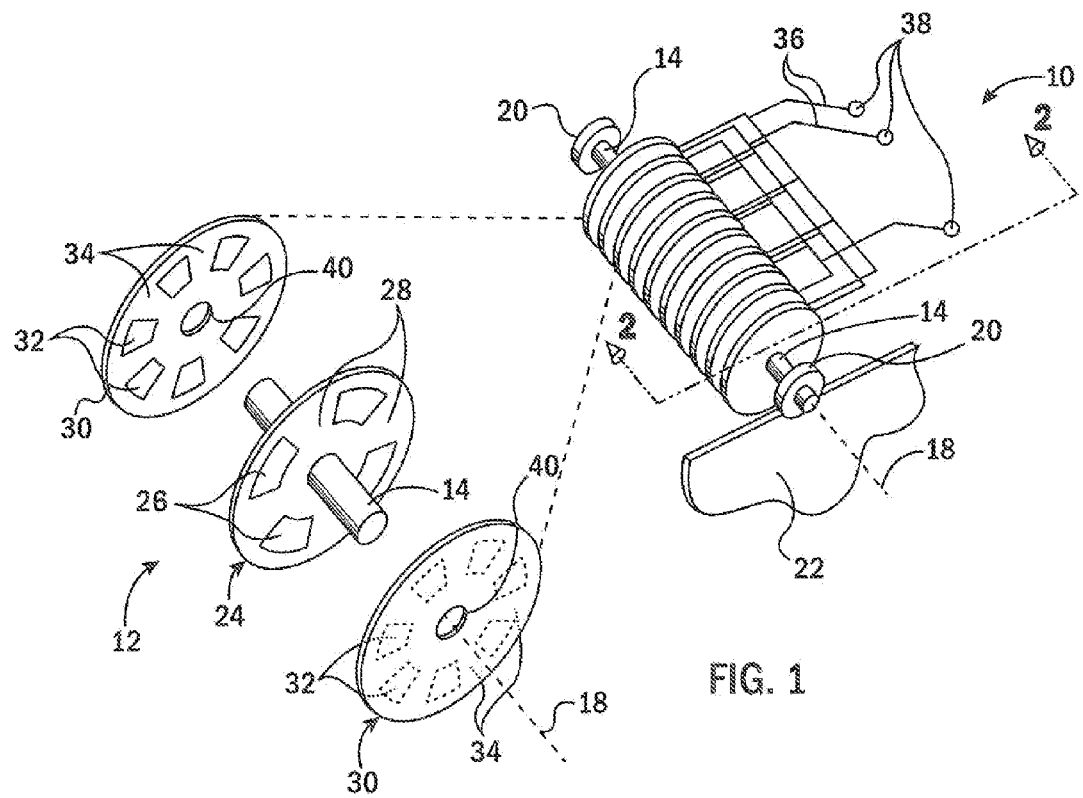
FIG. 1 is a perspective view of a varying capacitor rotating electrical machine according to one embodiment of the present invention and comprised of interleaved rotor and stator disks each having circumferentially spaced plates or plate regions and showing an exploded view of one set of such disks in unexploded form.

Referring now to FIG. 1, in one embodiment, a rotating electrical machine 10 per the present invention may provide a rotor 12 mounted on an axle 14 for rotation about an axis 18. The axle 14 may be supported at opposite ends by bearings 20 supported by a frame 22, the latter being generally stationary.

The rotor 12 may support one or more rotor disks 24 extending generally perpendicularly to the axis 18 to rotate with the axle 14. Front and rear surfaces of the rotor disks 24 made be divided into plate areas 26 and non-plate areas 28 spaced circumferentially therearound the axis 18. In this embodiment, plate areas 26 may be conductive plates on the opposite side of the rotor disks 24 and electrically joined through the rotor disk 24 or provided a continuous conductive or high dielectric material extending through the axial thickness of the rotor disk 24.

Flanking each rotor disk 24 along the axis 18 are two stator disks 30 having plates 32 separated and electrically isolated by insulating areas 34, each spaced at regular angular intervals about the axis 18. Clearance holes 40 in the stator disks 30 allow the axle 14 to pass therethrough and freely rotate therein. The stator disks 30 are supported by the frame 22 to remain substantially stationary with respect to the rotating rotor disk 24. Each rotor disk 24 and the two stator disks 30 comprise a three disk element that may be repeated along the axle 14 with the plates 32 and interconnected for parallel or series operation.

The plates 32 of each stator disk 30 are generally parallel to and closely proximate to the two opposite surfaces of the rotor disk 24 and thus to the plate areas 26 and non-plate areas 28. Rotation of the rotor disk 24 moves the plate areas 26 into alignment and out of alignment with the plates 32 of the stator disks 30. Generally, the center of the plates 32 of each stator disk 30 will be aligned with each other across the rotor disk 24 along lines parallel to the axis 18.

The plates 32 may be attached to electrical conductors 36 that communicate with terminals 38 of the rotating electrical machine 10 either for the receipt of electrical power when the rotating electrical machine 10 is used as a motor providing a mechanical output along the axle 14 or for the output of electrical power when the rotating electrical machine is used as a generator driven by mechanical force applied to the axle 14.

Figure 2:
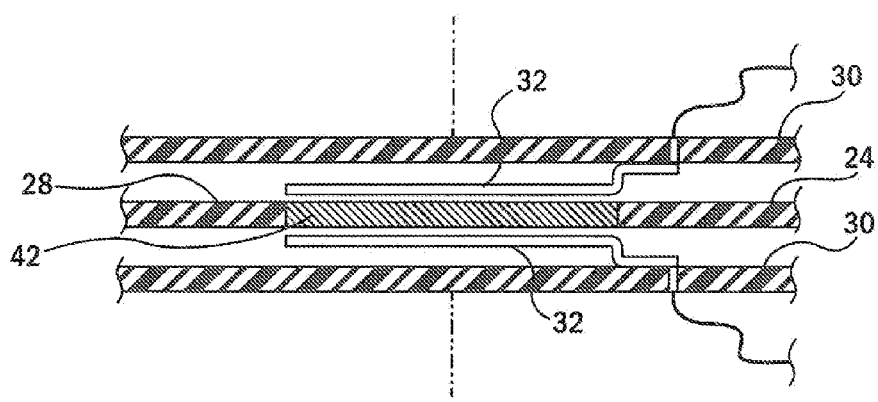
FIG. 2 is a cross-section along line 2-2 of FIG. 1 showing axial movable plates on the stator disks spring biased toward an interposed rotor disk.

Referring now to FIG. 2, in one embodiment the rotor disks 24 provide a rigid generally insulating material forming the non-plate areas 28 and broken by conductive segments 42 defining the plate areas 26. It will be understood that the conductive segment 42 may alternatively be implemented as two conductive plates on either face of the insulating material of the non-plate areas 28 joined by vias (not shown) extending therebetween. Alternatively, the rotor disk 24 may comprise a conductive material providing the plate areas 26 and having cutouts filled with insulating dielectric providing the non-plate areas 28

The plates 32 on the stator disks 30 may provide flexing conductive wings extending in cantilever fashion and generally parallel to a face of the stator disk 30 to which they are attached at one end. In this way, the plates 32 may "float" above the surfaces of the rotor disk 24 on a thin cushion of air drawn along the surface of the rotor disk 24 as it rotates with respect to the stator disks 30. A slight spring bias in the material of the plate 32 urges the plates 32 toward the surfaces of the rotor disk 24 against the countervailing pressure of the cushion of air on which they float.

Figure 3:
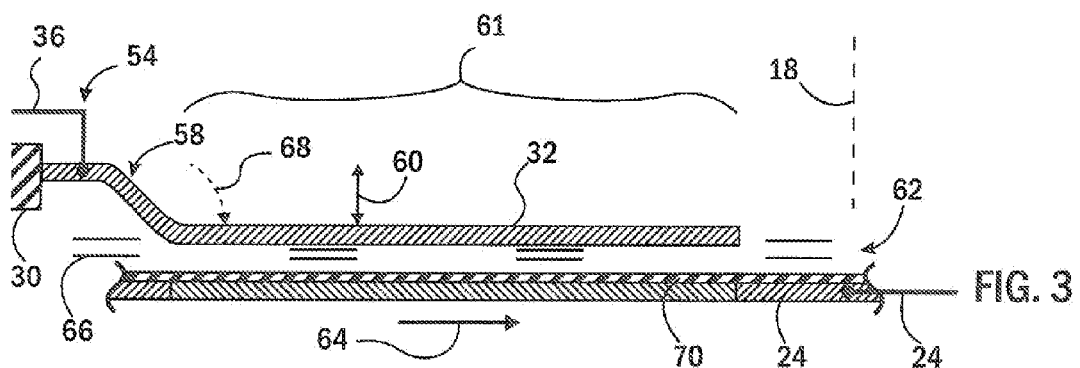
FIG. 3 is a cross-sectional view of one stator plate and one rotor plate region showing relative axial movement and spring biasing of the plate toward the plate region as supported away from the plate region by a first gap on a cushion of air generated movement of the rotor and showing a dielectric layer attached to the plate.

Referring now to FIG. 3, in one embodiment the plates 32 are attached at proximal end 54 to the stator disks 30 (and ultimately to the frame 22) by a flexing portion 58 or a hinge or other pivot of types known in the art allowing axial motion 60 (generally along axis 18) of a distal plate portion 61. This distal plate portion 61 will be generally parallel to a corresponding surface of the stator disk 30 and rotor disk 24 and spaced from the rotor disk 24 along axis 18 by a gap 62 which defines the plate separation. Movement of the distal plate portion 61 thus may change the gap 62.

Rotary motion 64 of the rotor disk 24 between the stator disks 30 draws air 66 into the gap 62 compressing that air to provide an air bearing between the rotor disk 24 and the plates 32. In this way, the plates 32 may float on a thin film of air against a bias force 68 applied to the plates 32, for example, by the natural elasticity of the flexing portion 58 or by a separate spring or the like. The bias force 68 may be adjusted to control the stiffness of the positioning of the plate 32 for the purpose of stability and the like as well as to control the absolute separation of the gap 62.

An outer surface of the rotor disk 24 opposite the plates 32 may be coated with a dielectric layer 70 such as Teflon® or other insulating and/or high dielectric material that may provide for insulation between the plate 32 and the rotating plate areas 26 when the plate 32 is no longer supported by the layer of air 66, for example, as shown in FIG. 3. Ideally, the dielectric layer 70 will have a breakdown voltage sufficient to prevent electrical direct current flow between plates 32 and plate areas 26 when there is zero air gap 62 and will provide some abrasion resistance. The dielectric layer 70 also increases the capacitance for a given gap 62.

Figure 4:
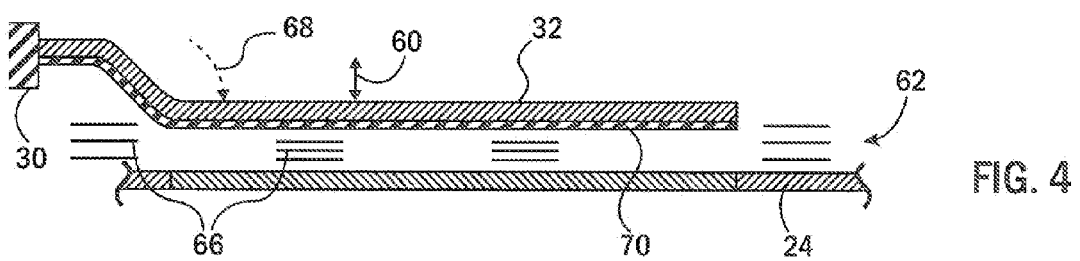
FIG. 4 is a figure similar to that of FIG. 3 in which a dielectric layer is placed on the axially movable plate and showing a second gap larger than the first gap caused by greater relative velocity between the plate and plate region.
Figure 5:
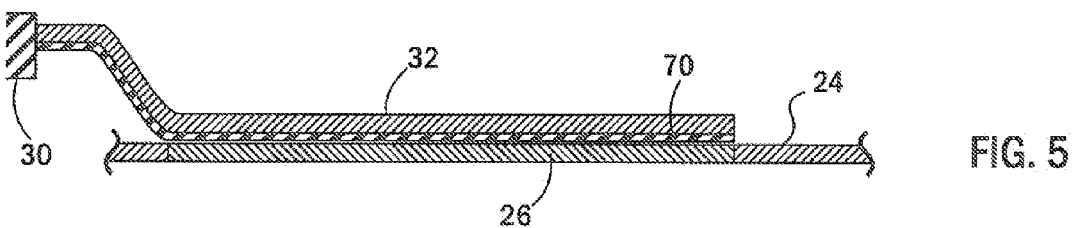
FIG. 5 is a figure similar to that of FIGS. 3 and 4 showing contact of the plate and plate region at start up of the rotating electrical machine before the cushion of air is developed, at which time the plates are insulated from each other by the dielectric layer.

Referring now to FIG. 4, in an alternative configuration the dielectric layer 70 may be attached to the surface of the plate 32 toward the rotor disk 24. This configuration shows a greater separation between plate 32 and plate area 26 of the rotor disk 24 as may occur as the rotational velocity of rotating plate areas 26 increases.

Figure 6:
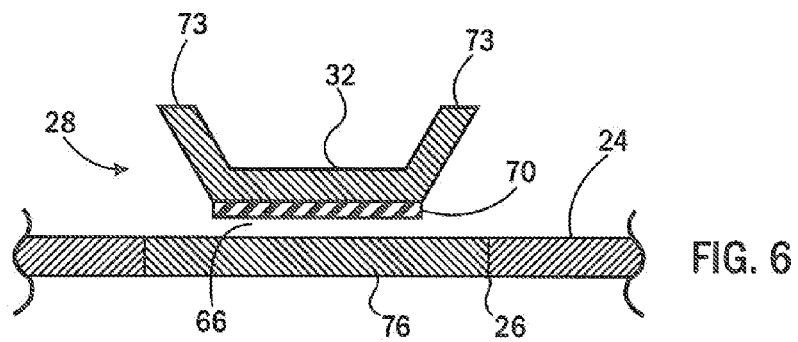
FIG. 6 is a cross-section perpendicular to the cross-sections of FIGS. 3-5 showing side ribs formed in the movable plate to provide for stiffness and light weight.

Referring now to FIG. 6, in one embodiment the plate 32 may have ribs 73, for example, formed as axial extensions on either side of the plate 32 to provide for greater stiffness and prevent undesirable longitudinal vibrations in the plate 32.

Figure 7:
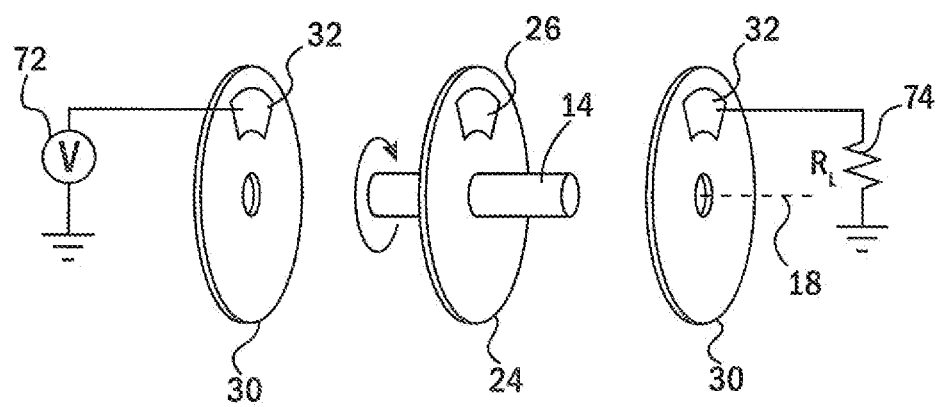
FIG. 7 is a simplified exploded view of a three disk unit of a rotating electrical machine having a rotor disk flanked by two stator disks and showing alignment and unalignment of plates and plate regions with rotation of the rotor disk.

Referring now to FIG. 7, rotation of the rotor disk 24 moves individual plate areas 26 into alignment and out of alignment with corresponding plates 32 on stator disks 30 flanking the rotor disk 24. When the plate area 26 is in alignment with the plates 32, the capacitance between the plates 32 is increased and correspondingly when plate area 26 is out of alignment with plates 32, capacitance between the plates 32 is decreased.

Figure 8:
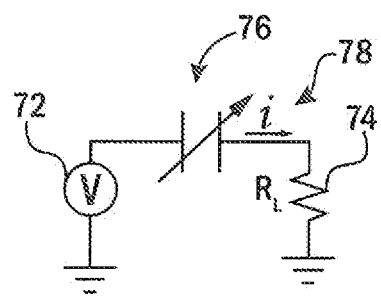
FIG. 8 is a simplified schematic representation of the three disk unit of FIG. 7 showing a varying capacitance formed by the plates and plate regions such as provides for the output of power with rotation of the rotor disk.

Referring now to FIG. 8, when the rotating electrical machine 10 is used as a generator, a DC voltage may be provided by an exciter voltage source 72 attached to one of the plates 32 and a resistive load 74 may be attached to the corresponding other of the plates 32. The effective varying capacitor 76 formed by plates 32 and plate areas 26 with rotation of the rotor disk 24 will pump an alternating current 78 through resistive load 74.

This process of power generation may be understood intuitively by considering an initial charging of the effective varying capacitor 76 when it has its maximum capacitance value with plate areas 26 aligned with plates 32. At this time the following relationship will apply:

$$q = C_{max} * V_{exciter}$$

When the value of the capacitance $C_{max}$ is reduced, with plate areas 26 moving away from plates 32 with further rotation of the rotor disk 24, $C_{max}$ drops to $C_{min}$ necessitating a decrease in q within the effective varying capacitor 76 (for the same exciter voltage $V_{exciter}$). This decrease in q constitutes a negative electric current through the resistive load 74 until the capacitance begins to increase to $C_{max}$ again, reversing the flow of charge to the positive direction which constitutes a current with a significant alternating current component.

Separating the plates of the effective varying capacitor 76 (e.g. plates 32 and plate areas 26) such as causes this reduction in capacitance requires movement against the attractive forces of the stored charges on the plates and thus requires the application of torque on the rotor disk 24, the mechanical power input to the generator.

For motor application, the exciter voltage source 72 may be replaced with an AC driving voltage source (including, for example, a commutated DC signal) and the resistive load 74 may be replaced with a direct path to ground. Here increasing the voltage across the effective varying capacitor 76 from the AC driving voltage increases the attractive force between plates 32 and plate areas 26 caused by the increase stored charge q. Reducing the applied voltage (or reversing it) decreases this force and these changes in force are harnessed to apply torque to the axle 14 in a manner analogous to those used with switched reluctance and synchronous reluctance motors.

Figure 9:
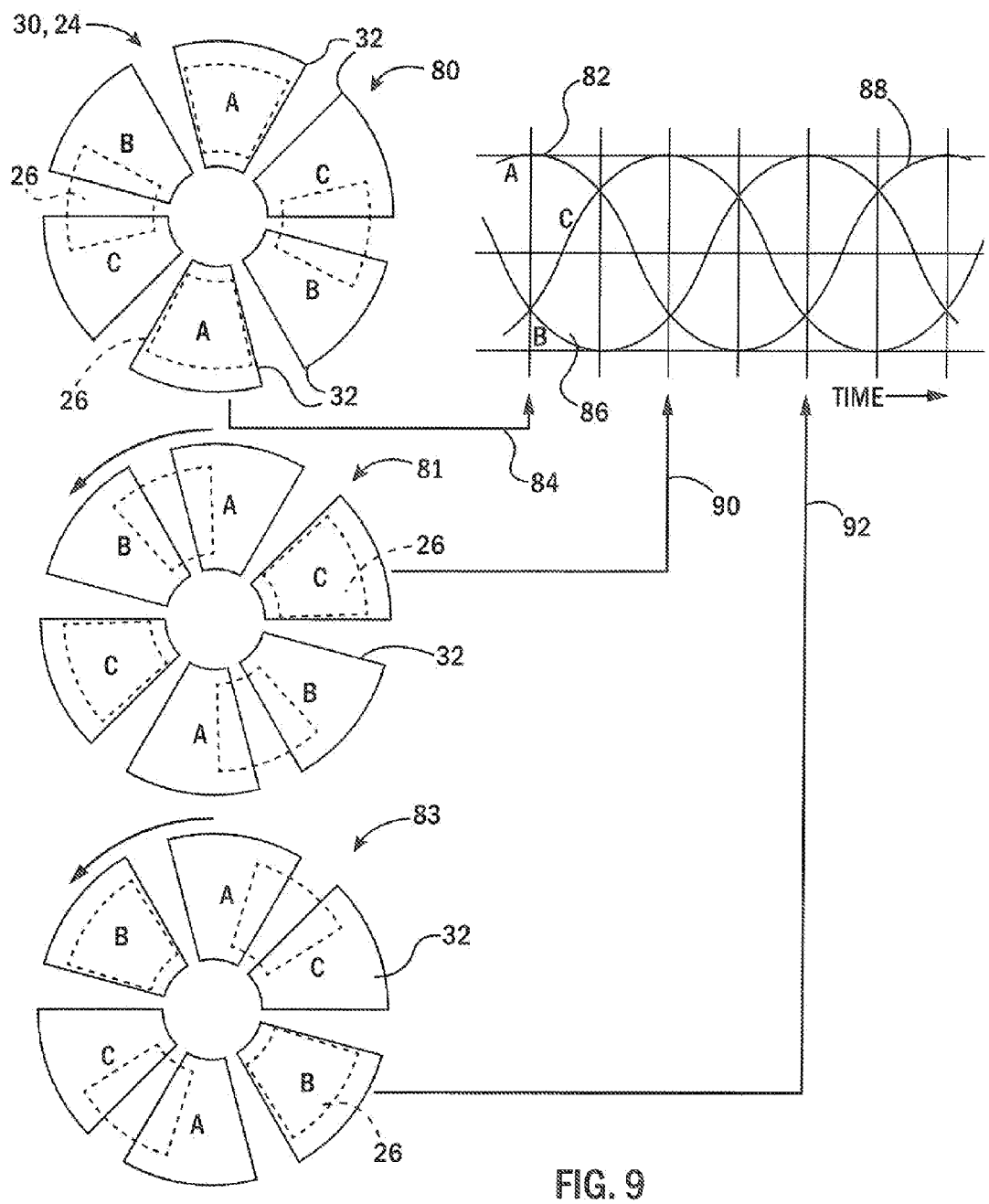
FIG. 9 is a set of three diagrams showing successive alignment of the plates of one or more stator disks with plate regions of a rotor disk for generating three-phase electrical power or conversely for receiving three-phase electrical power for generating torque.

Referring now to FIG. 9, a three phase system may be constructed, for example, by placing six plates 32 on stator disks 30 (shown in dotted lines) and four plates areas 26 on rotor disk 24 (shown in dotted lines) each distributed at equal angular intervals about the stator disks 30 or rotor disk 24, respectively. Diametrically opposed plates 32 are electrically connected to provide for three independent sets of plates denoted A, B, and C, each set connected to a different terminal 38 (shown in FIG. 1). Each of the four plate areas 26 on the rotor disk 24 in this example may be electrically independent.

At a first relative position 80 between the stator disk 30 and rotor disk 24, two of the diametrically opposed plate areas 26 on the rotor disk 24 may align fully with diametrically opposed plates 32 of set A outputting at a terminal 38 connected to set A, a maximum output voltage 82 at time 84. The remaining plate areas 26 of the rotor disk 24 span plates 32 of sets B and C providing corresponding output voltages 86 and 88 at two different terminals 38, these output voltages 86 and 88 being equal but only slightly above their minimum values.

A 30 degree counterclockwise rotation of the rotor disk 24 to position 81 brings diametrically opposed plate areas 26 into alignment with diametrically opposed plates 32 of set C outputting a maximum value of the output voltage 88 at time 90. At this time, the remaining plate areas 26 of the rotor disks 24 span the plates 32 of sets A and B providing output voltages 82 and 86 that are equal and only slightly above their minimum values.

Finally, an additional 30 degree counterclockwise rotation of the rotor disk 24 to position 83 brings two diametrically opposed plate areas 26 into alignment with diametrically opposed plates 32 of set B providing a maximum value output voltage 86 at a third terminal at time 92. The remaining plate areas 26 bridge the plates 32 of sets A and C producing output values at time 92 for output voltages 82 and 88 that are equal and only slightly above their minimum value.

It will be appreciated that the output voltages 82, 86 and 88 are depicted only approximately and generally will not be sine waves but only periodic waveforms that provide three phases of power separated each by 120 degrees of phase angle.

It will be further understood from the above description, that an application of a corresponding three phase AC signal per the output voltages 82, 86 and 88 will likewise provide rotation of the rotor disk 24 in the manner of a motor. In this case a three-phase signal is applied as an AC signal (which may be sinusoidal, square, trapezoidal, with or without DC offset depending on the specific physical design/shape and control approach of the machine) to the plates 32 and the corresponding plates 32 on the other stator disks 30 are tied to ground.

Figure 10:
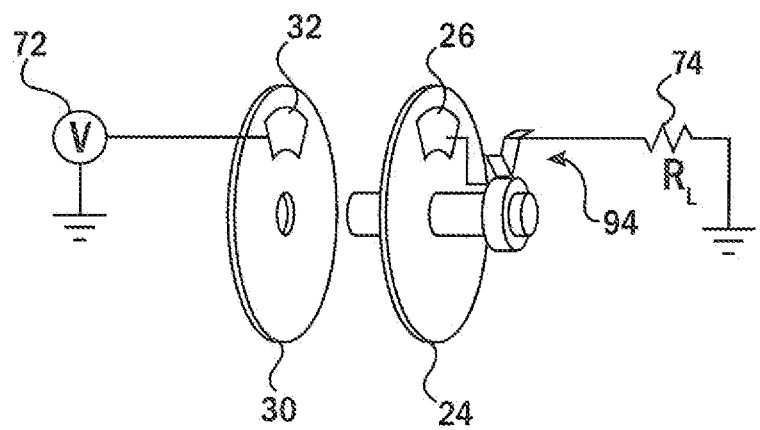
FIG. 10 is a figure similar to that of FIG. 7 showing a two disk unit embodiment of the rotating electrical machine employing a slip ring for communicating with plate regions on the rotor disk.

Referring now to FIG. 10, the repeatable units of a rotating rotor disk 24 and flanking stator disks 30 may, in an alternative embodiment, be replaced with a repeatable unit employing only two disks: one stationary stator disk 30 having one or more plates 32 as described above and one rotating rotor disk 24 having one or more plate areas 26 as described. In this embodiment, the plate areas 26 are attached to a corresponding slip ring 94 allowing electrical connection to a resistive load 74 to the plate areas 26. In operation, the plates 32 and plate areas 26 provide opposite plates of the effective varying capacitor 76 (shown in FIG. 8) differing from the previous embodiment notably in requiring a slip ring 94 for the attachment of the electrical circuit to the plate area 26.

It will be appreciated that the design of FIG. 10 may also be used as a motor as discussed above.

Figure 11:
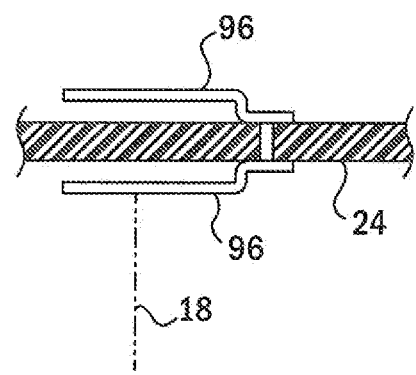
FIG. 11 is a figure similar to that of FIG. 2 showing an alternative configuration in which the movable plates are attached to the rotor disk.

Referring now to FIG. 11 it will be appreciated that the rotor disk 24 in the embodiment of FIG. 2 may in fact hold movable plate elements 96 analogous to plates 32 but attached to the rotor disk 24. These plate elements 96 may provide for axial outward movement toward flanking plates 32 which may now be affixed immovably to the surfaces of the rotor disks 30. The plate elements 96 may flex outward toward the plates 32 to be restrained and separated from those plates 32 by a cushion of air.

Figure 12:
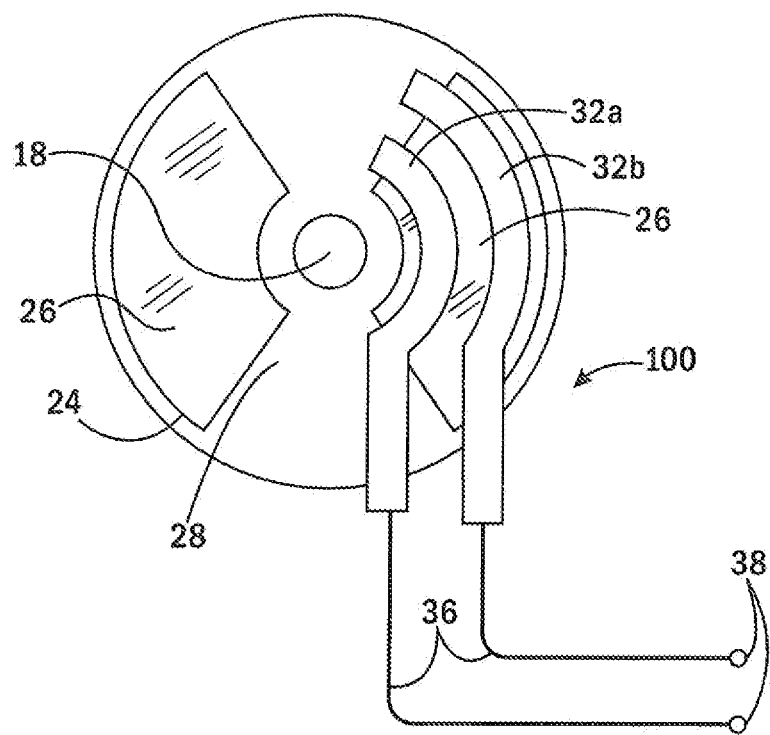
FIG. 12 is a front elevational view of the rotor disk having a stator comprised of two independently axially movable plates providing a two disk unit without the need for slip rings.

Referring now to FIG. 12, in an alternative embodiment, the rotor disk 24 may provide a plate area 26 and non-plate areas 28 exposed at one surface to a stator 100 comprising two electrically and mechanically independent plates 32*a* and 32*b* each separately supported on a cushion of air above the face of the rotor disk 24. Both of the plates 32*a* and 32*b* periodically align with the plate area 26 and then with the non-plate area 28 with rotation of the rotor disk 24. The effective varying capacitor 76 (shown in FIG. 8) is thus defined between plate 32*a* and plate 32*b* as moderated by plate area 26.

It will be understood that this approach of having the plate area 26 mediate between two plates 32*a* and 32*b* on a single side of the rotor disk 24 may be used in the embodiment of FIG. 9 by allowing the two plates A to serve as the plates 32*a* and 32*b*, and making similar terminal connections for the plates B and C. The diametrically opposite plate areas 26 are then electrically joined to provide a conductive path connecting in series the capacitance from plate areas 26 to successive pairs of plates A, B, and C. In this way, a two disk element using the configuration of FIG. 12 may avoid slip rings.

Figure 13:
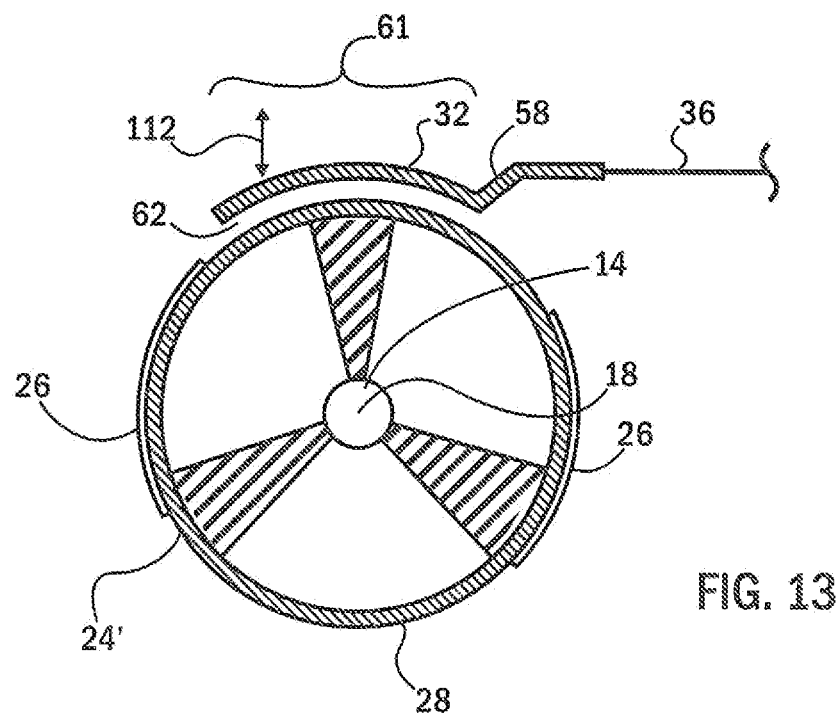
FIGS. 13 and 14 are an elevational cross-section and a perspective view of an alternative embodiment of the present invention employing a rotor cylinder instead of a rotor disk.
Figure 14:
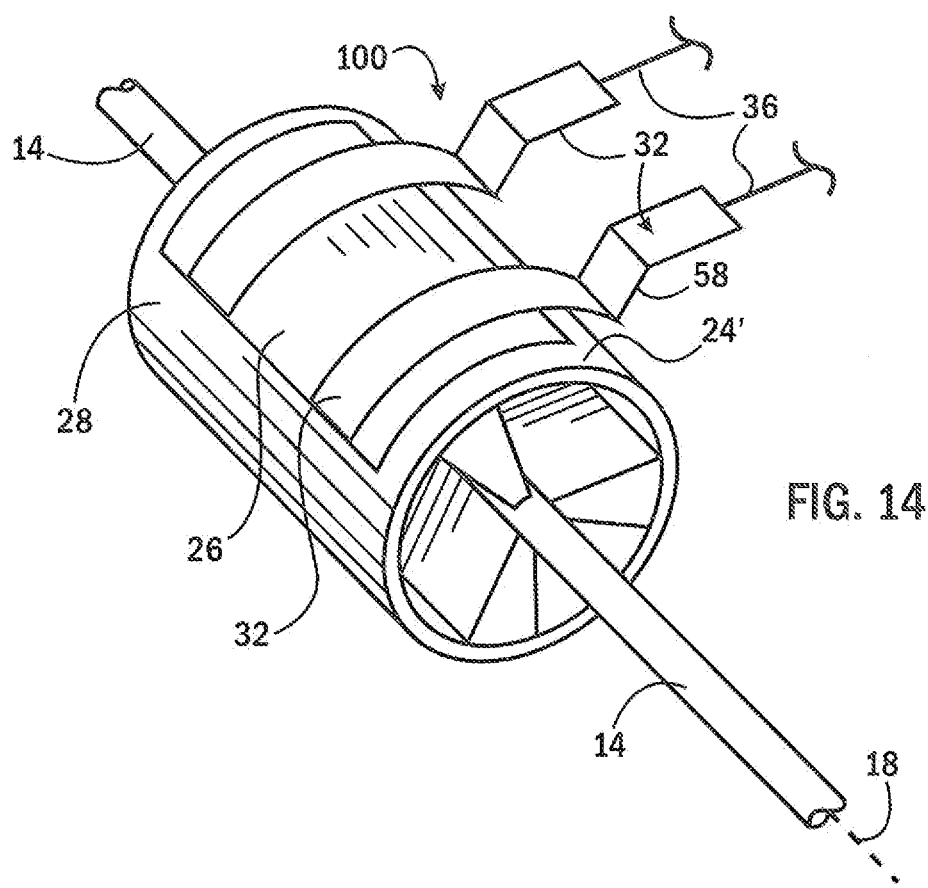

Referring now to FIGS. 13 and 14, it will be appreciated that the rotor disks 24 may instead be a rotor cylinder 24', the latter being a cylinder rotating about the axis 18 on axle 14. The outer surface of the cylinder 24' may support the plate area 26 and the non-plate area 28, for example, as a metallic cladding on the outer surface of an insulating material forming the substrate of the cylinder 24'. The stator 100 may be a pair of cantilevered plates 32 conforming to the surface of the cylinder 24'.

It will be appreciated that this cylindrical configuration of FIGS. 13 and 14 may also be used to implement the three disk element embodiment of FIG. 7 by joining plate areas 26 on diametrically opposed surfaces of the cylinder 24' with a diametric conductor or the like.

Figure 15:
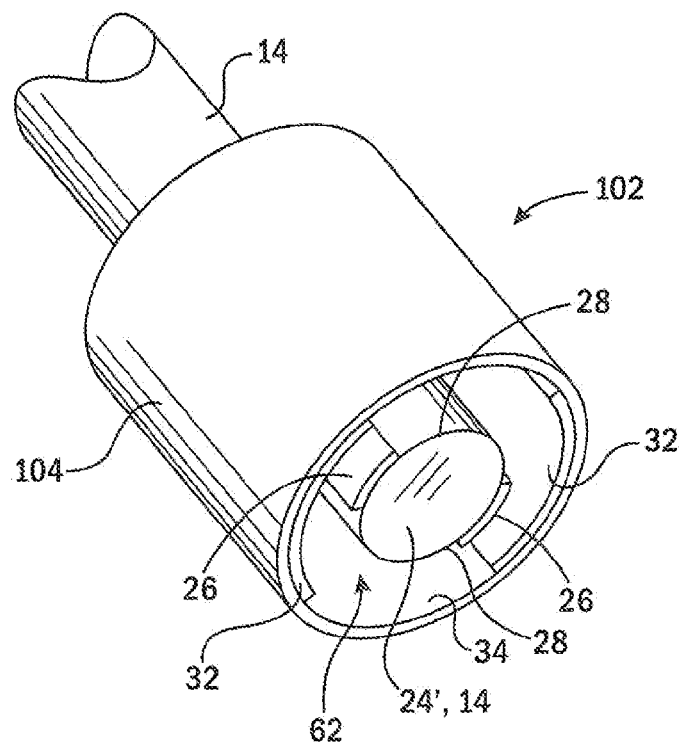
FIG. 15 is a perspective view of an alternative embodiment of the present invention in which the rotor cylinder is contained within a bearing sleeve to provide an air bearing supporting the axle of the motor.

Referring to FIG. 15, this cylindrical configuration may be implemented in the form of an air bearing 102 in which the rotor cylinder 24' is the outer periphery of the axle 14 having on its surface the plate areas 26 and non-plate areas 28, for example, separated from a metallic axle 14 by an insulating layer or where the axle 14 is a rigid insulating material such as the ceramic. A cylindrical sleeve 104 provides an outer bearing surface for the axle 14 and supports on its inner periphery plates 32. Rotation of the axle 14 within the cylindrical sleeve 104 traps a thin layer of fluid such as air between the outer walls of the axle 14 and the inner walls of the cylindrical sleeve 104 suspending it in the manner of an air bearing and also providing either generator or motor capabilities as described above.

Figure 16:
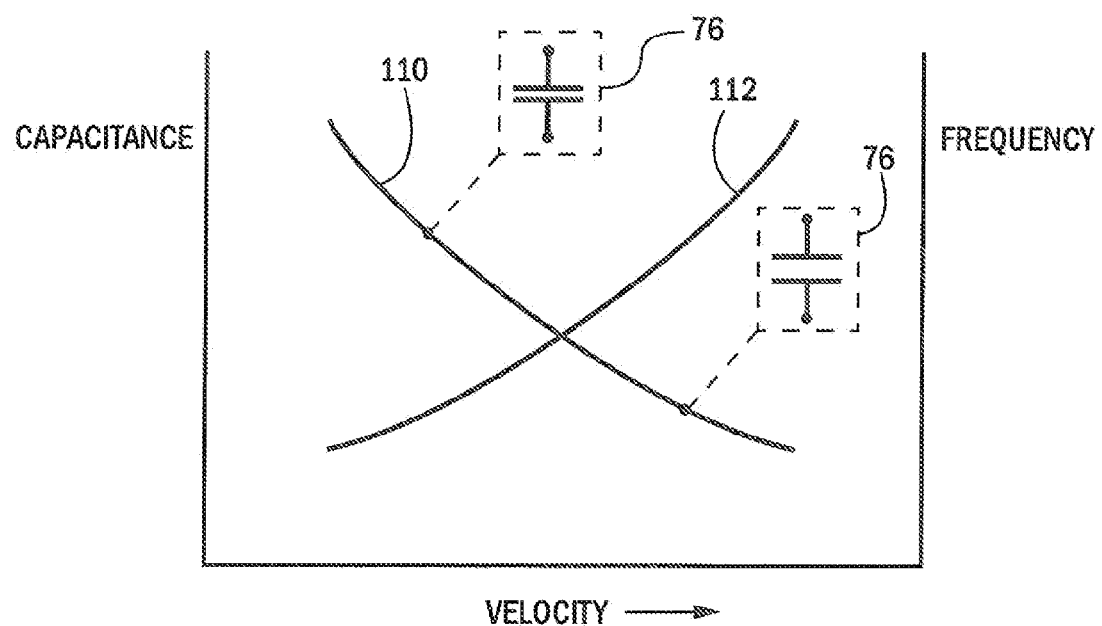
FIG. 16 is a plot of average capacitance of the varying capacitance of the rotating electrical machine as a function of rotor velocity and further showing corresponding transmission amplitude of a high-frequency signal through the varying capacitance as a function of rotor velocity.

Referring now to FIG. 16, there will generally be a relationship between the separation of the plates 32 and the plate areas 26 that will be proportional to the speed of rotation of the axle 14 and the latter will affect the average capacitance 110 between each stator plate 32 and plate areas 26 (for the two disk configuration or their equivalents) or between the stator plate 32 and corresponding stator plate 32 (for the three disk configuration or their equivalents). This capacitance may be measured, for example, by injection of a high-frequency signal into the stator plates 32 and measurement of that average capacitance 112 used to deduce velocity of the axle 14 for motor or generator control. At low velocities, stator plates 32 and rotating plate areas 26 are closer together forming a higher average capacitance 112 of effective varying capacitor 76 (shown in FIG. 8) whereas at high velocities, the separation of the rotating plate areas 26 and plates 32 increases forming lower average capacitances 112 of effective varying capacitor 76. This reduction in capacitance at higher velocities may moderate the motor's performance and may form the basis of an intrinsic speed control system.

It will be understood that monitoring the instantaneous capacitance between each stator plate 32 and plate areas 26 (for the two disk configuration or their equivalents) or between the stator plate 32 and corresponding stator plate 32 (for the three disk configuration or their equivalents) may likewise provide indication of the rotating position of the rotor disk 24 according to the regular periodicity of increasing and decreasing capacitance as occurs with alignment in this alignment of plates 32 and plate area 26. This position signal may be used for motor control according to generally understood control system techniques.

Figure 17:
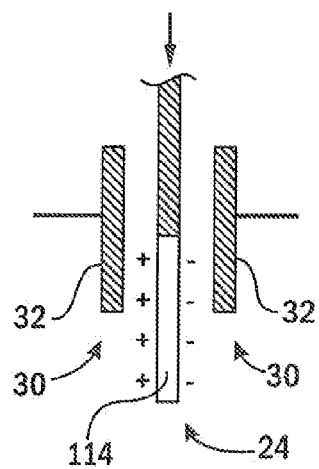
FIG. 17 is a simplified representation of a cross-section through two stators and a rotor disk in the embodiment of FIG. 7 in which the rotor disk includes an electret element.

Referring now to FIG. 17, the rotor disk 24 may incorporate an electret material 114, being a substance having a permanent electrical polarization, the electret material 114 providing electrostatic attraction (or repulsion) between itself and the plates 32 to provide dual-mode operation for a motor or generator invoking both variable capacitance effects and electrostatic effects. The latter may be useful not only for augmenting the operation of the device (either to generate electricity or torque) but possibly also to generate the voltage of the exciter voltage source 72 for a self starting generator in the same way that residual magnetism may be used in a conventional electromagnetic generator.

Figure 18:
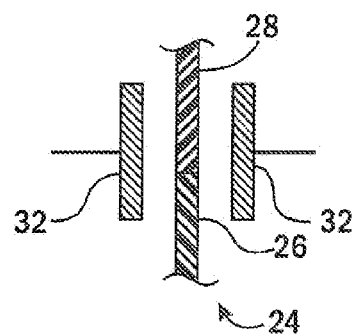
FIG. 18 is a figure similar to that of FIG. 17 wherein the rotor disk includes a high dielectric element.

Referring now to FIG. 18, while the principal embodiment contemplates that the plate area 26 of the rotor disk 24 will be a conductor, it will be appreciated that alternatively or additionally a high dielectric material may be used to vary the capacitance between the plates 32 and that the rotor disk 24 may provide for high dielectric material in the plate area 26 separated by low dielectric insulating materials in the non-plate areas 28.

Figure 19A:
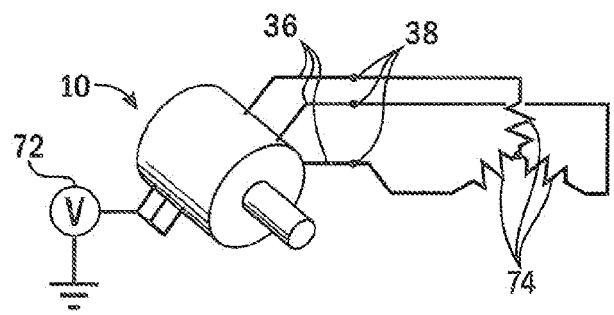
FIGS. 19a and 19b are simplified perspective diagrams showing configuration of the rotating electrical machine of the present invention as either a generator or a motor.

Referring now to FIG. 19a, when the rotating electrical machine 10 is operated as a generator, in the three phase configuration described with respect to FIG. 9, exciter voltage source 72 may be connected to each of the plates 32 on one or more stator disks 30 (being generally the left-hand stator plate of FIG. 7) and three phase power may be obtained through terminals 38 attached by conductors 36 to separate sets of electrodes (A, B, and C) of one or more corresponding stator plates 32 opposed across the rotor disk 24.

Figure 19B:
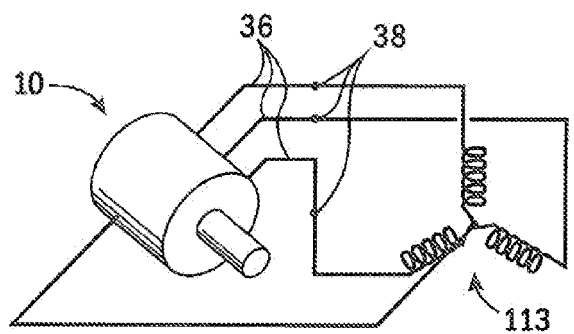

Referring to FIG. 19b, in contrast, in the motor configuration, an AC power source 113 may provide three phase power to the terminals 38 received by the separate set of plates 32 (A, B, and C) of one stator disk 30 with the opposed plates 32 of the stator disk 30 across the rotor disk 24 of plate 32 connected to ground.

It will be appreciated that the separation of the plates 32 and plate areas 26 in the above described embodiments that ride on a cushion of air, may alternatively ride on a cushion of an insulating fluid, such as a dielectric oil, the latter providing benefits in being non-compressible and thus improving the mechanical stability of the device and its resistance to attractive forces.

Figure 20:
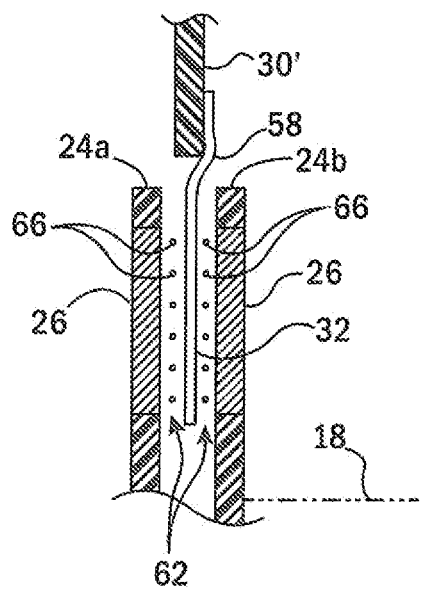
FIG. 20 is a figure similar to that of FIG. 2 showing an alternative embodiment providing a stator disk with a electrode shared between two rotor disks.
Figure 21:
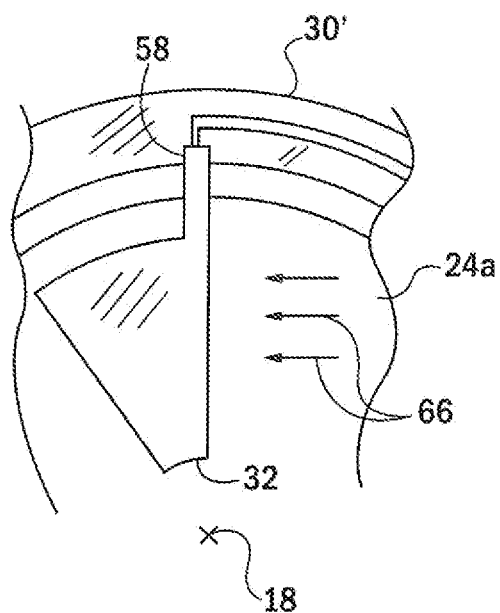
FIG. 21 is a fragmentary front elevational view of the shared electrode of FIG. 20.

Referring now to FIGS. 20 and 21, in an alternative embodiment the stator 30' may be in the form of a ring displacing it outside of the periphery of the rotor disks 24a and 24b. Electrodes 32 of the stator may extend radially inward from the stator disks 30 between the space defined by the axial separation of the rotor disks 24a and 24b. As so positioned, the electrodes 32 will be periodically opposed on opposite sides by respective plate areas 26 of the rotor disk 24a and 24b. To the extent that the forces between the plate areas 26 and the electrode 32 are thereby balanced, axial forces on the electrode 32 will be essentially canceled in favor of the desired torsional forces, the latter overcome when the rotating electrical machine 10 is operating in a generator mode or exploited as a driving force for rotation when the rotating electrical machine 10 is operating in a motor mode.

As before electrode 32 includes an ability to flex axially either by pivot, or flexure of the flexing portion 58 as shown in FIG. 20, so that it may "float" on streams of air 66 drawn along the surfaces of the rotor disks 24a and 24b in their rotation. Generally, these fluid forces will cause a centering of the plate 32 between the rotor disks 24a and 24b.

In this embodiment the axial spacing of the rotor disks 24a and 24b may be closer than in the embodiment of FIG. 1 providing an axially more compact device. The forces of the air 66 on opposite sides of the plate 32, in this embodiment, may eliminate the need for substantial spring biasing of the plate 32. It will be understood from this description that the plate 32 may alternatively be bifurcated into two mutually electrically isolated plates 32 sharing a common pivot to self center between the rotor disks 24a and 24b while providing separate electrical paths, if desired.

It will be understood according to standard usage that elements considered to be electrically attached to the terminals of a component may be joined directly by a conductor or indirectly through other intervening elements, this indirect attachment ending upon reaching a terminal of the component.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context. Although the stator and rotors are shown as disks in the disclosed embodiments, there is no requirement that the stator or rotor be in a disk form.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications, are hereby incorporated herein by reference in their entireties.

We claim:

1. A rotating electrical machine comprising:
   a stator supported on a frame and having at least one stator plate;
   a rotor supported on an axle supported on bearings mounted on the frame for rotation of the axle about an axis with respect to the stator and including at least one rotor plate positioned to pass by the stator plate during rotation of the rotor with respect to the stator; and
   a liquid film between the stator and rotor;
   wherein the at least one stator plate and at least one rotor plate are axially movable to float in separation when the at least one rotor plate passes by the at least one stator plate on the liquid film so that during operation of the rotating electrical machine, the liquid suspends the at least one stator plate and at least one rotor plate in separation in a manner of a fluid bearing and without mechanical contact between the at least one rotor plate and the at least one stator plate and intervening solid bearing materials.

2. The rotating electrical machine of claim 1 further including a spring element biasing at least one of the at least one rotor plate and the at least one stator plate axially toward the other of the at least one rotor plate and the at least one stator plate.

3. The rotating electrical machine of claim 2 wherein the stator supports at least two conductive stator plates connected to stationary terminals on the frame for communication with external circuitry.

4. The rotating electrical machine of claim 3 wherein the rotating electrical machine is a motor and further including an AC voltage source attached across the terminals.

5. The rotating electrical machine of claim 4 wherein the stator include three electrically independent sets of plates distributed in equal angles about the axis, the plates of each set joined electrically to a common terminal.

6. The rotating electrical machine of claim 1 further including a second stator positioned on an opposite side of the rotor from the stator, the second stator providing at least one second rotor plate positioned to pass by at least one rotor plate during rotation of the rotor with respect to the stator.

7. The rotating electrical machine of claim 6 wherein at least one rotor plate of the rotor is positioned and adapted to be centered between the stator and second stator by the liquid passing between the rotor and stator and second stator on two opposed sides of the rotor.

8. The rotating electrical machine of claim 1 wherein the at least one rotor plate provides a dielectric layer on a side of the rotor plate proximate to the stator.

9. The rotating electrical machine of claim 1 wherein the at least on stator plate is an electrical conductor.

10. The rotating electrical machine of claim 1 wherein the stator is a disk extending perpendicularly to the axis.

11. The rotating electrical machine of claim 1 wherein the liquid is a dielectric oil.

12. A method of operating a rotating electrical machine having a stator supported on a frame and having at least one stator plate and having a rotor supported on an axle supported on bearings mounted on the frame for rotation of the axle about an axis with respect to the stator and including at least one rotor plate positioned to pass by the stator plate during rotation of the rotor with respect to the stator, and further having a liquid film between the stator and rotor wherein the at least one stator plate and at least one rotor plate are axially movable to float in separation when the at least one rotor plate passes by the at least one stator plate on the liquid film so that during operation of the rotating electrical machine, the liquid suspends the at least one stator plate and at least one rotor plate in separation in a manner of a fluid bearing and without mechanical contact between the at least one rotor plate and the at least one stator plate and intervening solid bearing materials, the method comprising the step of:

(a) applying a varying voltage to the at least one stator plate to generate forces between the stator and the rotor to apply a torque to the rotor to rotate the rotor with respect to the stator.

13. The method of claim 2 wherein the liquid is a dielectric oil.

14. A rotating electrical machine comprising:

a stator supported on a frame and having at least one stator plate connected to a stationary terminal on the frame for communication with external circuitry;

a rotor supported on an axle supported on bearings mounted on the frame for rotation of the axle about an axis with respect to the stator and including at least one rotor plate positioned to pass by the stator plate during rotation of the rotor with respect to the stator;

at least one slip ring communicating between the at least one rotor plate and a stationary terminal on the frame; and a fluid film between the stator and rotor;

wherein the at least one stator plate and at least one rotor plate are axially movable to float in separation when the at least one rotor plate passes by the at least one stator plate on the fluid film so that during operation of the rotating electrical machine, the fluid suspends the at least one stator plate and at least one rotor plate in separation in a manner of a fluid bearing and without mechanical contact between the at least one rotor plate and the at least one stator plate and intervening solid bearing materials.

15. The rotating electrical machine of claim 14 wherein the fluid is a gas.

* * * * *